United States Patent
Plumer et al.

(10) Patent No.: US 9,429,402 B2
(45) Date of Patent: Aug. 30, 2016

(54) MULTI-STAGE DRIVE MECHANISMS

(71) Applicant: Simmonds Precision Products, Inc., Vergennes, VT (US)

(72) Inventors: Matthew Plumer, Huntington, VT (US); Randy Buker, Wolcott, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 591 days.

(21) Appl. No.: 13/869,793

(22) Filed: Apr. 24, 2013

(65) Prior Publication Data

US 2014/0318292 A1   Oct. 30, 2014

(51) Int. Cl.
  *F42B 10/14*     (2006.01)
  *F42B 10/64*     (2006.01)
  *F16H 21/54*     (2006.01)

(52) U.S. Cl.
  CPC .............. *F42B 10/14* (2013.01); *F16H 21/54* (2013.01); *F42B 10/64* (2013.01); *Y10T 74/18888* (2015.01); *Y10T 74/18944* (2015.01)

(58) Field of Classification Search
  CPC ........ F16H 21/54; F42B 10/12; F42B 10/14; F42B 10/18; F42B 10/64
  USPC ............. 74/65–67, 75, 99 A, 99 R, 101, 102
  See application file for complete search history.

(56) References Cited

U.S. PATENT DOCUMENTS

| 6,186,443 B1* | 2/2001 | Shaffer ............... B64C 5/12 244/3.29 |
| 6,698,688 B1* | 3/2004 | Jones .................. B64C 1/26 244/215 |
| 2011/0180655 A1 | 7/2011 | Deschatre | |

FOREIGN PATENT DOCUMENTS

| EP | 2354755 A1 | 8/2011 |
| GB | 2150092 A | 6/1985 |
| GB | 2214882 A | 9/1989 |
| WO | WO-02/18867 A1 | 3/2002 |

OTHER PUBLICATIONS

Extended European Search Report dated Jun. 30, 2014 for Application No. 14/165,886.4-1655.

* cited by examiner

*Primary Examiner* — Nicholas McFall
(74) *Attorney, Agent, or Firm* — Locke Lord LLP; Scott D. Wofsy; Alicia J. Carroll

(57) ABSTRACT

A multi-stage drive includes a linear actuator configured for linear movement along an actuation axis, and a control surface. The control surface is operatively connected to the linear actuator for rotation about a deployment axis in a deployment stage, and for rotation in a control stage about a control axis that is different from the deployment axis, so that movement of the linear actuator along the actuation axis drives rotation of the control surface in both the deployment stage and in the control stage.

19 Claims, 3 Drawing Sheets

Fig. 1
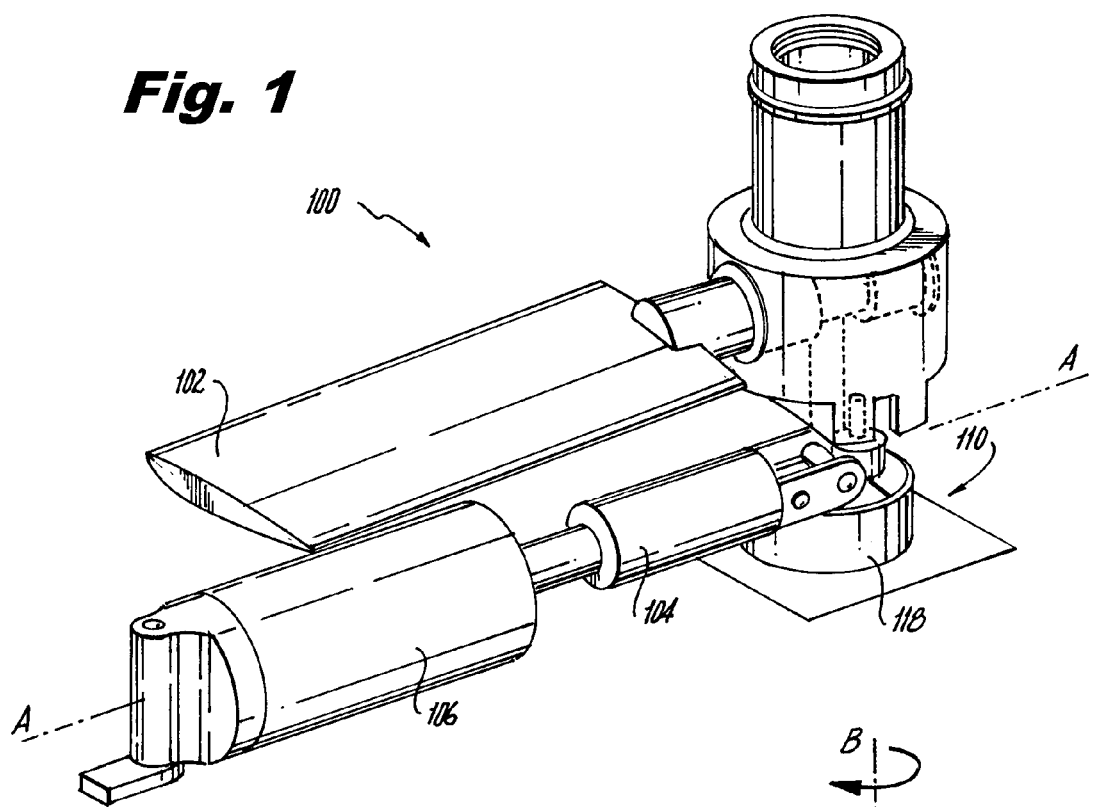
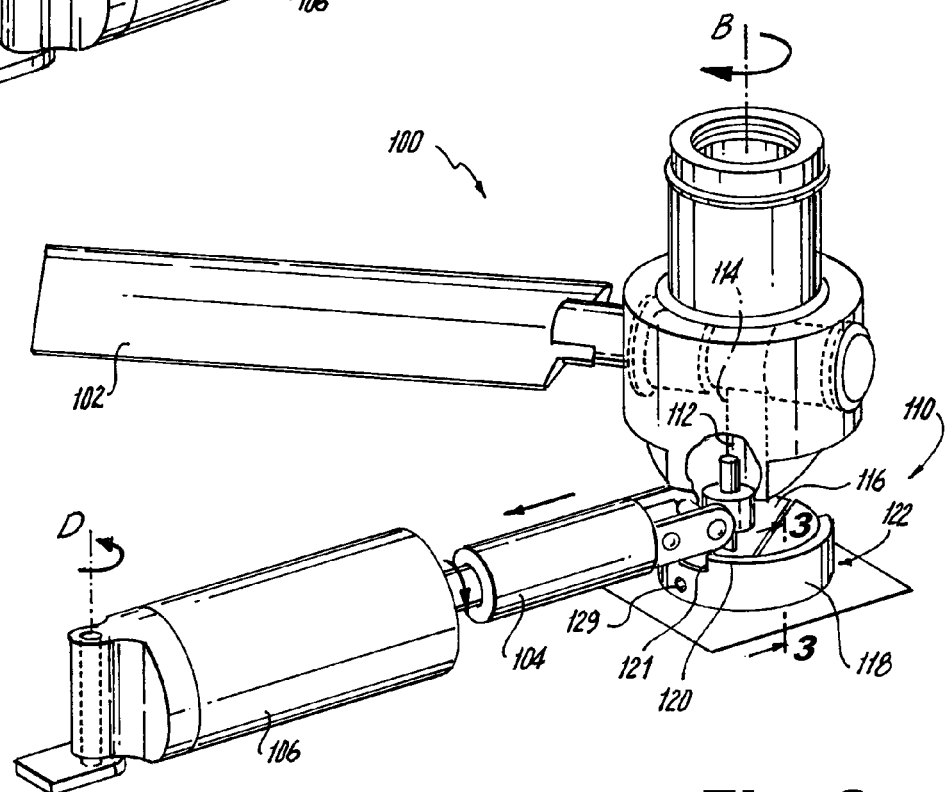
Fig. 2

MULTI-STAGE DRIVE MECHANISMS

BACKGROUND OF THE INVENTION

1. Field of the Invention

The present invention relates to drive mechanisms and more particularly to multi-stage drive mechanisms, for example, multi-stage drive mechanisms for deploying and controlling a control surface, such as a canard.

2. Description of Related Art

A variety of drive systems are known in the art for actuating control surfaces, such as canards, on projectiles, or the like. It is commonly desired to have canards rotate about a deployment axis from within the projectile to deploy the canards, for example after launching of the projectile. Following deployment it is often desired to rotate the canards about an axis different from the deployment axis, for controlling the flight of the projectile.

In the past, mechanisms for canard deployment and control typically require a motor and additional energy sources, such as rotational inertia, springs, gas generators, or the like. A small gear ratio is typically required for a fast canard deployment, but a high gear ratio is required for accuracy when controlling the canard. Typically, the canard is the only item that rotates about the deployment axis, and the canard and its support structure rotate about the control axis. This can result in a complex output shaft and complex support structure due to the slot in the output shaft typically needed to allow the canard to sweep through its deployment angle.

Such conventional methods and systems have generally been considered satisfactory for their intended purpose. However, there is still a need in the art for systems and methods that allow for improved performance and reduced cost. There also remains a need in the art for such a drive mechanism system that is easy to make and use. The present invention provides a solution for these problems.

SUMMARY OF THE INVENTION

The subject invention is directed to a new and useful multi-stage drive. The multi-stage drive includes a linear actuator configured for linear movement along an actuation axis. The linear movement along the actuation axis drives rotation in a first axis at a first speed and in a second axis at a second speed.

The subject invention also provides a new and useful multi-stage drive. The multi-stage drive includes a linear actuator and a driven member. The linear actuator is configured for linear movement along an actuation axis. The driven member is operatively connected to the linear actuator for rotation about a first axis in a first stage, and for rotation in a second stage about a second axis that is different from the first axis. Movement of the linear actuator along the actuation axis drives rotation of the driven member in both the first stage and in the second stage.

The subject invention also provides a new and useful multi-stage drive for deploying and controlling a control surface. The multi-stage drive includes a linear actuator configured for linear movement along an actuation axis, and a control surface operatively connected to the linear actuator for rotation about a deployment axis in a deployment stage, and for rotation in a control stage about a control axis that is different from the deployment axis, so that movement of the linear actuator along the actuation axis drives rotation of the control surface in both the deployment stage and in the control stage.

In certain embodiments of the subject invention, the deployment axis and the control axis can be oriented substantially perpendicular to one another. In addition, the control surface can be a canard. The linear actuator can include a drive motor and a mechanism for converting rotary motion from the motor into linear motion. The linear actuator can be configured for rotation about a pivot axis in the deployment stage, wherein the pivot axis is different from the actuation axis. The pivot axis of the linear actuator can be substantially parallel to the deployment axis.

In another aspect, the multi-stage drive can include a lock operatively connected to the linear actuator and control surface to lock the control surface against rotation around the control axis in the deployment stage, and to lock the control surface against rotation around the deployment axis in the control stage. The lock can include a link having a first end operatively connected to the control surface for rotation of the control surface around the control axis, and a second end engaging a swivel cap, wherein the swivel cap includes a rim that prevents movement of the second end of the link beyond the swivel cap in the deployment stage to prevent movement of the link about the control axis. The rim of the swivel cap can include a notch that permits movement of the second end of the link in the control stage to allow rotation of the link about the control axis.

In accordance with certain embodiments, the lock can also include a swivel having an inner swivel member and a swivel cap configured for relative rotation, wherein the inner swivel member is operatively connected to the control surface for rotation about the deployment axis, and wherein the swivel includes a catch operatively connected to the inner swivel member and the swivel cap to allow relative rotation of the inner swivel member and the swivel cap in the deployment stage for rotation of the control surface about the deployment axis, and to catch and prevent relative rotation of the inner swivel member and the swivel cap in the control stage to prevent rotation of the control surface about the deployment axis. The catch can catch with the control surface in a deployed position to prevent the rotation as described above.

The lock can also include a control surface catch operatively connected to the control surface to allow rotation of the control surface in the deployment stage about the deployment axis, and to catch the control surface in the control stage to prevent rotation of the control surface about the deployment axis in the control stage. The control surface catch can be configured and adapted to prevent rotation of other lock components, such as the link, swivel and/or inner swivel member, about the deployment axis in the control stage, while allowing the link to rotate about the control axis along with the control surface in the control stage. The link can have a first end operatively connected to the control surface, as described above. The swivel can have an inner swivel member operatively connected to a second end of the link for rotation about the deployment axis, also as described above. The control surface catch can include a pin and an output shaft with a detent, wherein the pin catches in the detent of the output shaft to stop rotation of the control surface and link about the deployment axis in the control stage while allowing rotation about the control axis in the control stage.

It is further contemplated that the first end of the link can be operatively connected to the control surface for common rotation of the link with the control surface about the deployment and control axes and the second end can be opposite the first end. An inner swivel member, as described above, can be operatively connected to the second end of the link for rotation about the deployment axis with the link in the deployment stage.

The multi-stage drive can also include an actuator link rotatably linked to the linear actuator, and a pin extending from the second end of the link with a pin axis defined longitudinally along the pin. The actuator link can be rotatably and slideably connected to the pin for rotation about the pin axis in the deployment stage and for sliding along the pin in the control stage. The pin can be substantially parallel to the link.

These and other features of the systems and methods of the subject invention will become more readily apparent to those skilled in the art from the following detailed description of the embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 1 is a perspective view of an exemplary embodiment of a multi-stage drive constructed in accordance with the present invention, showing the multi-stage drive in the beginning of a deployment stage;

FIG. 2 is a perspective view of the multi-stage drive of FIG. 1, showing the multi-stage drive in the deployment stage rotating about a deployment axis;

DETAILED DESCRIPTION OF THE PREFERRED EMBODIMENTS

Figure 3:
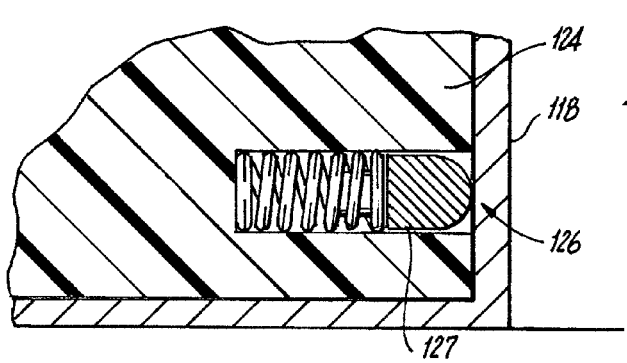
FIG. 3 is a cross-sectional elevation view of a portion of the multi-stage drive of FIG. 1, showing a swivel with an inner swivel member, a swivel cap and a catch.

Reference will now be made to the drawings wherein like reference numerals identify similar structural features or aspects of the subject invention. For purposes of explanation and illustration, and not limitation, a perspective view of an exemplary embodiment of a multi-stage drive in accordance with the invention is shown in FIG. 1 and is designated generally by reference character 100. Other embodiments of the multi-stage drive in accordance with the invention, or aspects thereof, are provided in FIGS. 2-7, as will be described.

Referring now to FIG. 1, a multi-stage drive 100 for deploying and controlling a control surface, shown as a canard 102, is shown at the beginning of a deployment stage. Multi-stage drive 100 includes a linear actuator 104 configured for linear movement along an actuation axis A. The linear movement of linear actuator 104 along actuation axis A drives rotation of canard 102 in both the deployment stage and in a control stage. Linear actuator 104 includes a drive motor 106 and a mechanism for converting rotary motion from the motor into linear motion. Those having skill in the art will readily appreciate that the mechanism for converting rotary motion into linear motion can be a gear mechanism such as a ball screw, worm drive, solenoid, gas generator, or the like. Those having skill in the art will readily appreciate that it is not necessary to have rotary motion converted to linear motion, any suitable linear actuator can be used. The use of a single drive motor 106 for rotation of canard 102 about a deployment axis B, shown in FIG. 2, and a control axis C, shown in FIG. 4, reduces cost and complexity compared to traditional drives. Although the control surface is shown and described herein as a canard, those having skill in the art will readily appreciate that a variety of control surfaces can be used.

Referring now to FIG. 2, canard 102 is operatively connected to linear actuator 104 and is depicted in the deployment stage rotating about deployment axis B. Linear actuator 104 is configured for rotation about a pivot axis D in the deployment stage. Pivot axis D of linear actuator 104 is substantially parallel to deployment axis B. Multi-stage drive 100 also includes a lock 110 operatively connected to linear actuator 104 and canard 102 to lock canard 102 against rotation around control axis C in the deployment stage, and to lock canard 102 against rotation around deployment axis B in the control stage. Lock 110 includes a link 112 having a first end 114 operatively connected to canard 102 for common rotation of link 112 and canard 102 about deployment and control axes, B and C. Those having skill in the art will readily appreciate that the linear movement along actuation axis A can drive rotation in a first axis, i.e. deployment axis B, at a first speed and in a second axis, i.e. control axis C, at a second speed.

Figure 5:
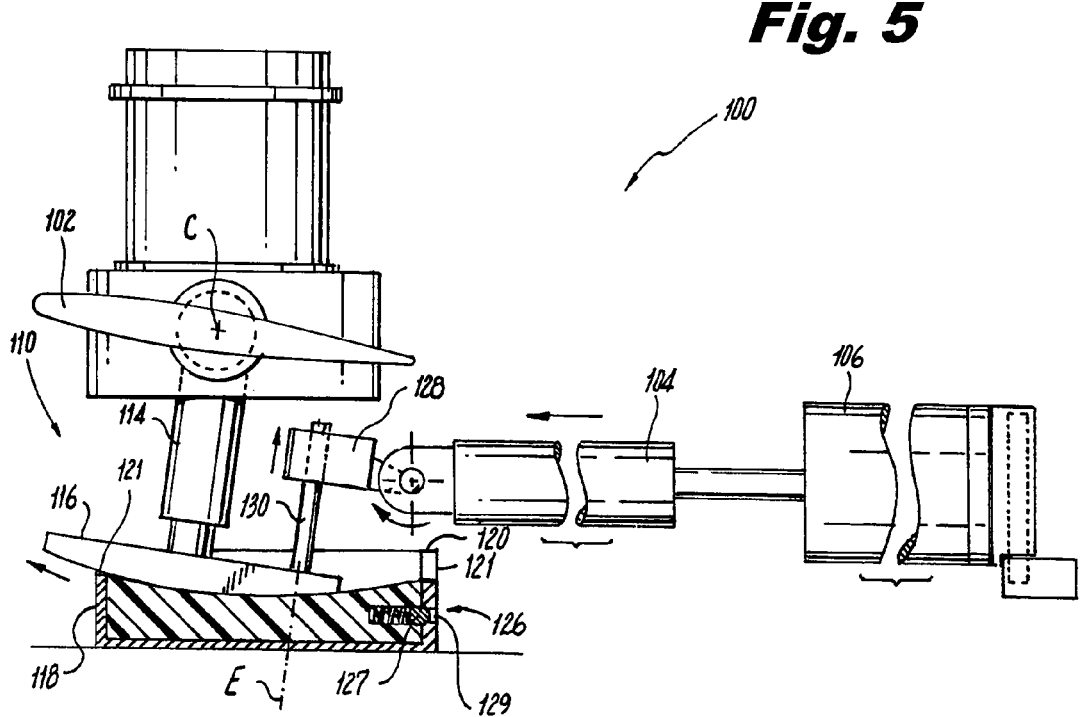
FIG. 5 is a partially cross-sectional elevation view of the multi-stage drive of FIG. 1, showing the multi-stage drive in the control stage rotating about a control axis in a clockwise direction.
Figure 6:
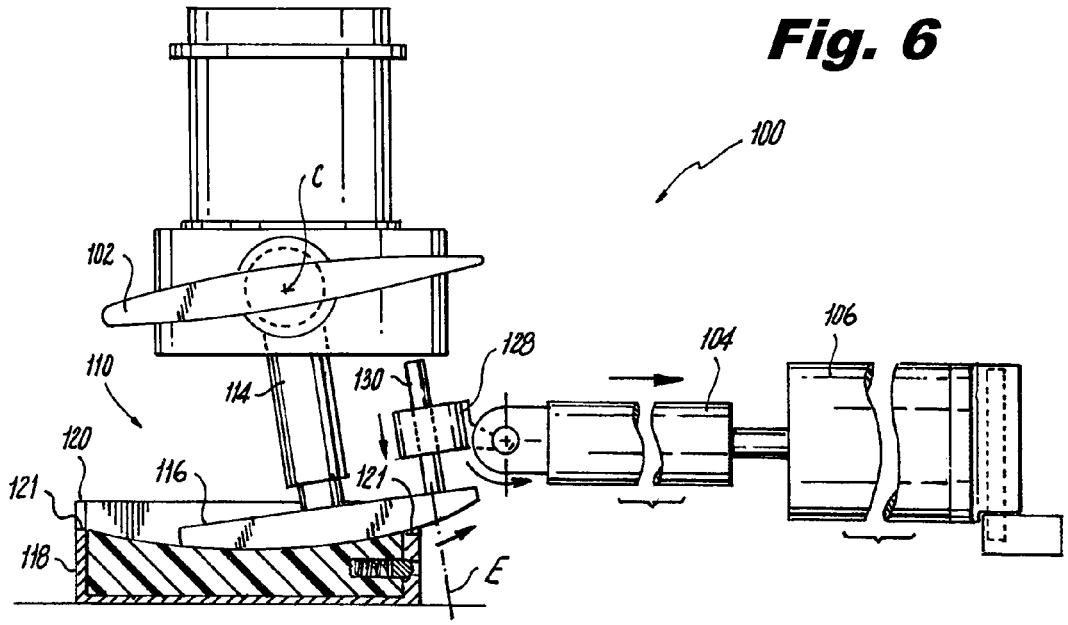
FIG. 6 is a partially cross-sectional elevation view of the multi-stage drive of FIG. 1, showing the multi-stage drive in the control stage rotating about a control axis in a counter-clockwise direction.

With further reference to FIG. 2, link 112 has a second end 116 opposite first end 114, which engages a swivel 122. Swivel 122 includes a swivel cap 118 and an inner swivel member 124, identified in FIG. 4. Inner swivel member 124 and swivel cap 118 are configured for relative rotation. Swivel cap 118 includes a rim 120 that prevents movement of second end 116 of link 112 beyond swivel cap 118 in the deployment stage to prevent movement of link 112 about control axis C. Rim 120 of swivel cap 118 includes a notch 121 that permits movement of second end 116 of link 112 in the control stage to allow rotation of link 112 about control axis C, as shown in FIGS. 5 and 6. Inner swivel member 124, as described above is operatively connected to second end 116 of link 112 and canard 102, for common rotation about deployment axis B with link 112 in the deployment stage.

With reference now to FIGS. 2 and 3, swivel 122 includes a catch 126 operatively connected to inner swivel member 124 and swivel cap 118 to allow relative rotation of inner swivel member 124 and swivel cap 118 in the deployment stage for rotation of canard 102 about deployment axis B, and to catch and prevent relative rotation of inner swivel member 124 and swivel cap 118 in the control stage to prevent rotation of canard 102 about deployment axis B. Catch 126 includes a spring loaded button 127 disposed in inner swivel member 124 and a button receiver 129 in swivel cap 118. Although catch 126 is shown and described herein as a spring loaded button 127 and button receiver 129, those having skill in the art will readily appreciate that a variety of catch mechanisms can be used, such as a detent pin with a coil spring and a cammed surface, a ratcheting catch, or the like.

Figure 7:
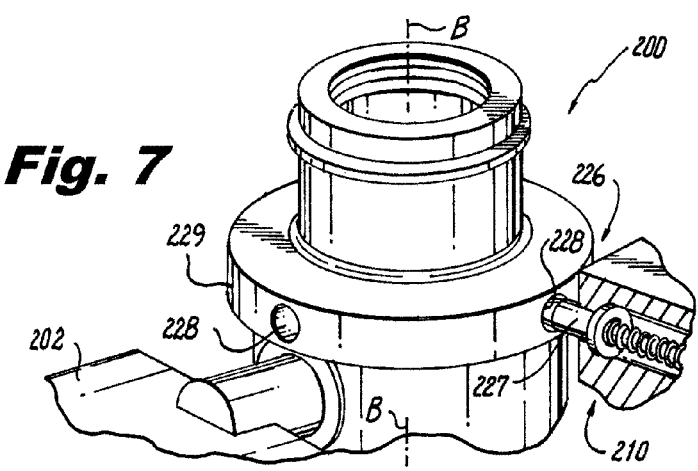
FIG. 7 is an enlarged cut-away perspective view of an exemplary embodiment of a multi-stage drive constructed in accordance with the present invention, showing the multi-stage drive in the beginning of the deployment stage with a control surface catch.

Referring now to FIG. 7, a partial view of a multi-stage drive 200 and lock 210 are shown. Lock 210, is substantially similar to lock 110 described above, with a different location for the catch, i.e. control surface catch 226. Control surface catch 226 is operatively connected to a control surface 202 to allow rotation of control surface 202 in the deployment stage about deployment axis B, and to catch control surface 202 in the control stage to prevent rotation of control surface 202 about the deployment axis B in the control stage.

Control surface catch 226 can be used in conjunction with other components of multi-stage drive 100, not shown in FIG. 7, such as linear actuator 104, link 112 and swivel 122, as described above. Control surface catch 226 includes a pin 227 and an output shaft 229 with a detent 228. Pin 227 is engaged with a first detent 228. Pin 227 is configured and adapted to disengage with first detent 228 to allow rotation of control surface 202 about deployment axis B in the deployment stage, and then to engage with a second detent 228, not shown in FIG. 7, to stop rotation of control surface 202 about deployment axis B in the control stage while allowing rotation about control axis C in the control stage. Second detent 228 is located approximately ninety degrees in the counter-clockwise direction, as viewed in FIG. 7, from the first detent 228. Pin 227 catches in the second detent 228 of output shaft 229 to stop rotation of control surface 202 and link 112 about deployment axis B in the control stage. Those skilled in the art will readily appreciate that although only two detents 228 are shown in FIG. 7, multiple detents 228 can be located at various positions on output shaft 229 and can be used as needed for specific applications. Further, those skilled in the art will readily appreciate that control surface catch 226 can be used in lieu of or in conjunction with catch 126, described above. In addition, those skilled in the art will readily appreciate that the disengaging and engaging timing and motion of pin 227 can be controlled by a variety of mechanisms, such as a motor, or the like, and that any other suitable catch locations can be used.

Figure 4:
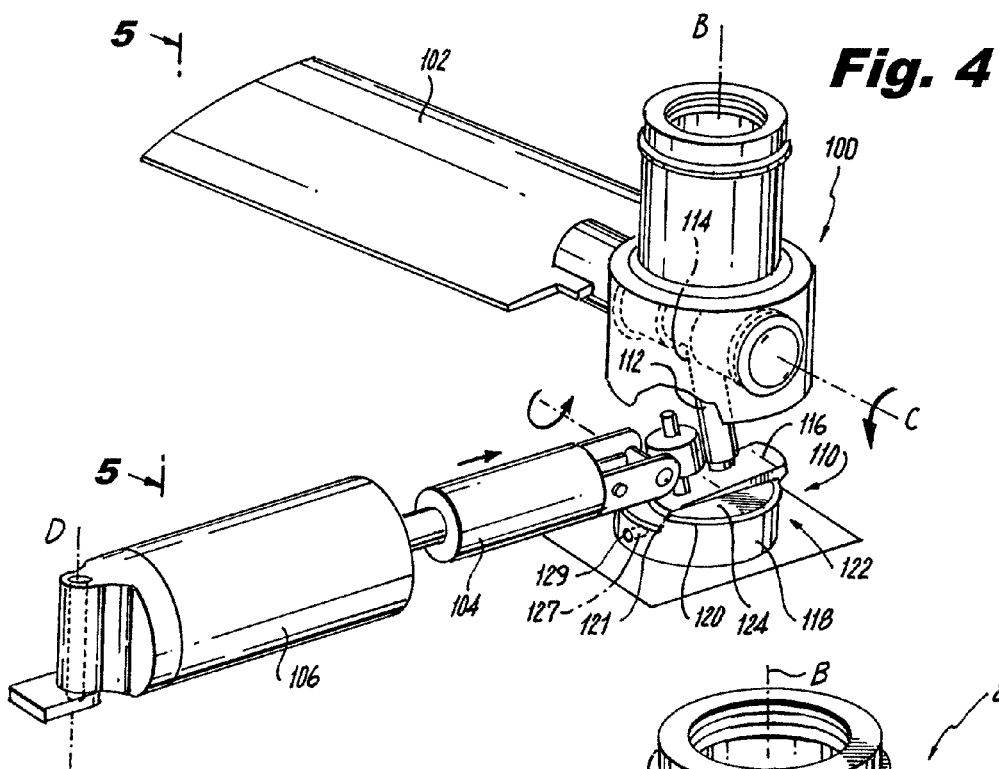
FIG. 4 is a cut-away perspective view of the multi-stage drive of FIG. 1, showing the multi-stage drive in a control stage with a canard in a deployed position.

Those skilled in the art will also readily appreciate that first end 114 of link 112 can be operatively connected to control surface 202 for rotation of control surface 202 around deployment axis B during the deployment stage and around control axis C, shown in FIG. 4, in the control stage. Control surface catch 226 is configured and adapted to prevent rotation of link 112 about deployment axis B in the control stage. Swivel 122 and inner swivel member 124 can be connected to second end 116 of link 112, similar to the configuration described above, wherein control surface catch 226 is also configured and adapted to allow rotation of link 112 and inner swivel member 124 about deployment axis B in the deployment stage, and to prevent rotation of link 112 and inner swivel member 124 about deployment axis B in the control stage, while allowing link 112 to rotate about control axis C in the control stage.

Referring now to FIG. 4, multi-stage drive 100 is depicted in the control stage rotating about control axis C. In the control stage, canard 102 is configured for rotation about control axis C using movement of the same linear actuator 104 along actuation axis A as was used in the deployment stage. Deployment axis B and control axis C are oriented substantially perpendicular to one another, however any other suitable axes orientation can be used as needed for specific applications. In the control stage, spring loaded button 127 of inner swivel member 124 is engaged with button receiver 129 of swivel cap 118 preventing relative rotation of inner swivel member 124 and swivel cap 118, thereby preventing rotation of canard 102 about deployment axis B. Link 112 and canard 102, however, are configured to rotate about control axis C in the control stage.

Referring now to FIGS. 5 and 6, multi-stage drive 100 includes an actuator link 128 rotatably linked to linear actuator 104, and a pin 130 extending from second end 116 of link 112 with a pin axis E defined longitudinally along pin 130 substantially parallel to link 112. In the deployment stage, actuator link 128 is configured to be rotated about pin axis E and pin 130, as shown in FIG. 2. In the control stage, actuator link 128 is configured to slide along pin axis E and pin 130. FIG. 5 shows canard 102 rotating about control axis C in a clockwise direction while actuator link 128 slides axially upwards along pin axis E, as oriented in FIGS. 5 and 6. FIG. 6 shows canard 102 rotating about control axis C in a counter-clockwise direction while actuator link 128 slides axially downwards along pin axis E.

The following is an exemplary use of multi-stage drive 100. Deployment of canard 102 from within a projectile, for example, begins when linear actuator 104 moves along actuation axis A. The linear movement of linear actuator 104 along actuation axis A, through actuator link 128, and pin 130, drives rotation of inner swivel member 124, link 112, and canard 102 about deployment axis B. During rotation about deployment axis B rim 120, of swivel cap 118, prevents rotation of link 112 about any additional axes. To stop rotation of inner swivel member 124, link 112 and canard 102 about deployment axis B, catch 126, operatively associated with inner swivel member 124 and swivel cap 118, catches the rotation of inner swivel member 124, therein locking further rotation of inner swivel member 124, link 112 and canard 102 about deployment axis B. Rim 120 of swivel cap 118 includes notch 121, that, when in the locked position, permits movement of second end 116 of link 112 about control axis C. Those having skill in the art will readily appreciate that control surface catch 226 can also be used to stop rotation of inner swivel member 124, link 112 and canard 102, 202 about deployment axis B.

Once locked, the deployment stage is complete and canard 102 is deployed from the projectile. The linear movement of linear actuator 104 now drives rotation of link 112 and canard 102 about control axis C in the control stage. During the control stage the same linear movement of linear actuator 104 as described above, through actuator link 128 and pin 130, drives rotation of link 112 and canard 102 about control axis C. The control stage can be used to maneuver the projectile by rotating canard 102 into various positions about control axis C. Catch 126 operates to keep inner swivel member still with respect to both deployment and control axes, B and C respectively, in the control stage, while still allowing link 112 and canard 102 to rotate about control axis C. Should it be desired to revert back to the deployment stage, those skilled in the art will readily appreciate that spring loaded button 127 of catch 126 can easily be compressed back into inner swivel member 124 and inner swivel member 124, link 112 and canard 102 can be rotated about deployment axis B back to their pre-deployment position.

The methods and systems of the present invention, as described above and shown in the drawings, provide for multi-stage drive mechanisms for deploying and controlling a control surface, e.g. a canard, with superior properties including reduced cost and complexity. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A multi-stage drive for deploying and controlling a control surface comprising:
   a linear actuator configured for linear movement along an actuation axis; and
   a control surface operatively connected to the linear actuator for rotation about a deployment axis in a deployment stage, and for rotation in a control stage about a control axis that is different from the deployment axis, so that movement of the linear actuator along the actuation axis drives rotation of the control surface in both the deployment stage and in the control stage; and
   a lock operatively connected to the linear actuator and control surface to lock the control surface against rotation around the control axis in the deployment stage, and to lock the control surface against rotation around the deployment axis in the control stage, wherein the lock includes a link having a first end operatively connected to the control surface for rotation of the control surface around the control axis, wherein the link further includes a second end engaging a swivel cap, and wherein the swivel cap includes a rim that prevents movement of the second end of the link beyond the swivel cap in the deployment stage to prevent movement of the link about the control axis, and wherein the rim of the swivel cap includes a notch that permits movement of the second end of the link in the control stage to allow rotation of the link about the control axis.

2. A multi-stage drive as recited in claim 1, wherein the deployment axis and the control axis are oriented substantially perpendicular to one another.

3. A multi-stage drive as recited in claim 1, wherein the linear actuator includes a drive motor and a mechanism for converting rotary motion from the motor into linear motion.

4. A multi-stage drive as recited in claim 1, wherein the linear actuator is configured for rotation about a pivot axis in the deployment stage, wherein the pivot axis is different from the actuation axis.

5. A multi-stage drive as recited in claim 4, wherein the pivot axis of the linear actuator is substantially parallel to the deployment axis.

6. A multi-stage drive as recited in claim 1, wherein the control surface is a canard.

7. A multi-stage drive as recited in claim 1, wherein the lock includes a control surface catch operatively connected to the control surface to allow rotation of the control surface in the deployment stage about the deployment axis, and to catch the control surface in the control stage to prevent rotation of the control surface about the deployment axis in the control stage.

8. A multi-stage drive as recited in claim 7, wherein the lock includes a link having a first end operatively connected to the control surface for rotation of the control surface around the deployment axis during the deployment stage and around the control axis in the control stage, wherein the control surface catch is configured and adapted to prevent rotation of the link about the deployment axis in the control stage while allowing rotation about the control axis in the control stage.

9. A multi-stage drive for deploying and controlling a control surface comprising:
   a linear actuator configured for linear movement along an actuation axis;
   a control surface operatively connected to the linear actuator for rotation about a deployment axis in a deployment stage, and for rotation in a control stage about a control axis that is different from the deployment axis, so that movement of the linear actuator along the actuation axis drives rotation of the control surface in both the deployment stage and in the control stage; and
   a lock operatively connected to the linear actuator and control surface to lock the control surface against rotation around the control axis in the deployment stage, and to lock the control surface against rotation around the deployment axis in the control stage, wherein the lock includes a swivel having an inner swivel member and a swivel cap configured for relative rotation, wherein the inner swivel member is operatively connected to the control surface for rotation about the deployment axis, and wherein the swivel includes a catch operatively connected to the inner swivel member and the swivel cap to allow relative rotation of the inner swivel member and the swivel cap in the deployment stage for rotation of the control surface about the deployment axis, and to catch and prevent relative rotation of the inner swivel member and the swivel cap in the control stage to prevent rotation of the control surface about the deployment axis.

10. A multi-stage drive as recited in claim 9, further comprising:
    a link having a first end operatively connected to the control surface for common rotation of the link with the control surface about the deployment and control axes and a second end opposite the first end; and
    a swivel including an inner swivel member and a swivel cap configured for relative rotation, wherein the inner swivel member is operatively connected to the second end of the link for rotation about the deployment axis with the link in the deployment stage.

11. A multi-stage drive as recited in claim 10, further comprising a catch operatively connected to the inner swivel member and the swivel cap to allow relative rotation of the inner swivel member and the swivel cap in the deployment stage for rotation of the control surface about the deployment axis, and to catch with the control surface in a deployed position to prevent relative rotation of the inner swivel member and the swivel cap to prevent rotation of the control surface about the deployment axis in the control stage.

12. A multi-stage drive as recited in claim 10, further comprising:
    an actuator link rotatably linked to the linear actuator; and
    a pin extending from the second end of the link with a pin axis defined longitudinally along the pin, wherein the actuator link is rotatably and slideably connected to the pin for rotation about the pin axis in the deployment stage and for sliding along the pin in the control stage.

13. A multi-stage drive as recited in claim 12, wherein the pin is substantially parallel to the link.

14. A multi-stage drive as recited in claim 9, wherein the lock includes a control surface catch operatively connected to the control surface to allow rotation of the control surface in the deployment stage about the deployment axis, and to catch the control surface in the control stage to prevent rotation of the control surface about the deployment axis in the control stage.

15. A multi-stage drive as recited in claim 14, wherein the lock includes a link having a first end operatively connected to the control surface for rotation of the control surface around the deployment axis during the deployment stage and around the control axis in the control stage, wherein the control surface catch is configured and adapted to prevent rotation of the link about the deployment axis in the control stage while allowing rotation about the control axis in the control stage.

16. A multi-stage drive as recited in claim 15, wherein the lock includes a swivel having an inner swivel member operatively connected to a second end of the link for rotation about the deployment axis, wherein the control surface catch is configured and adapted to allow rotation of the link and the inner swivel member about the deployment axis in the deployment stage, and to prevent rotation of the link and the inner swivel member about the deployment axis in the control stage, while allowing the link to rotate about the control axis in the control stage.

17. A multi-stage drive as recited in claim 14, wherein the control surface catch further includes a pin and an output shaft with a detent, wherein the pin is configured and adapted to disengage with the detent to allow rotation of the control surface about the deployment axis in the deployment stage, and then to engage with the detent to stop rotation of the control surface about the deployment axis in the control stage while allowing rotation about the control axis in the control stage.

18. A multi-stage drive for deploying and controlling a control surface comprising:
   a linear actuator configured for linear movement along an actuation axis;
   a control surface operatively connected to the linear actuator for rotation about a deployment axis in a deployment stage, and for rotation in a control stage about a control axis that is different from the deployment axis, so that movement of the linear actuator along the actuation axis drives rotation of the control surface in both the deployment stage and in the control stage; and
   a lock operatively connected to the linear actuator and control surface to lock the control surface against rotation around the control axis in the deployment stage, and to lock the control surface against rotation around the deployment axis in the control stage, wherein the lock includes a control surface catch operatively connected to the control surface to allow rotation of the control surface in the deployment stage about the deployment axis, and to catch the control surface in the control stage to prevent rotation of the control surface about the deployment axis in the control stage, wherein the control surface catch further includes a pin and an output shaft with a detent, wherein the pin is configured and adapted to disengage with the detent to allow rotation of the control surface about the deployment axis in the deployment stage, and then to engage with the detent to stop rotation of the control surface about the deployment axis in the control stage while allowing rotation about the control axis in the control stage.

19. A multi-stage drive for deploying and controlling a control surface comprising:
   a linear actuator configured for linear movement along an actuation axis;
   a control surface operatively connected to the linear actuator for rotation about a deployment axis in a deployment stage, and for rotation in a control stage about a control axis that is different from the deployment axis, so that movement of the linear actuator along the actuation axis drives rotation of the control surface in both the deployment stage and in the control stage; and
   a lock operatively connected to the linear actuator and control surface to lock the control surface against rotation around the control axis in the deployment stage, and to lock the control surface against rotation around the deployment axis in the control stage, wherein the lock includes a control surface catch operatively connected to the control surface to allow rotation of the control surface in the deployment stage about the deployment axis, and to catch the control surface in the control stage to prevent rotation of the control surface about the deployment axis in the control stage, wherein the lock includes a link having a first end operatively connected to the control surface for rotation of the control surface around the deployment axis during the deployment stage and around the control axis in the control stage, wherein the control surface catch is configured and adapted to prevent rotation of the link about the deployment axis in the control stage while allowing rotation about the control axis in the control stage, wherein the lock includes a swivel having an inner swivel member operatively connected to a second end of the link for rotation about the deployment axis, wherein the control surface catch is configured and adapted to allow rotation of the link and the inner swivel member about the deployment axis in the deployment stage, and to prevent rotation of the link and the inner swivel member about the deployment axis in the control stage, while allowing the link to rotate about the control axis in the control stage.

\* \* \* \* \*